(12) United States Patent
Kim

(10) Patent No.: US 6,298,963 B1
(45) Date of Patent: Oct. 9, 2001

(54) TUNED BROADBAND VIBRATIONAL DISSIPATOR

(75) Inventor: Michael Kim, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/257,474

(22) Filed: Feb. 25, 1999

(51) Int. Cl.⁷ .......................................................... F16F 7/10
(52) U.S. Cl. ............................................. 188/379; 267/136
(58) Field of Search ..................................... 188/268, 378, 188/379, 380; 267/136, 1.5

(56) References Cited

U.S. PATENT DOCUMENTS

| | | | | |
|---|---|---|---|---|
| 3,110,262 | * | 11/1963 | West ...................................... | 102/399 |
| 3,130,700 | * | 4/1964 | Peterson .............................. | 114/20.1 |
| 4,173,130 | * | 11/1979 | Sutliff et al. .............................. | 64/23 |
| 4,350,233 | * | 9/1982 | Buckley ................................ | 188/378 |
| 4,560,150 | * | 12/1985 | Shtarkman .............................. | 267/35 |
| 4,706,788 | * | 11/1987 | Inman et al. .......................... | 188/378 |
| 5,712,447 | * | 1/1998 | Hanson ................................ | 114/20.1 |
| 5,855,260 | * | 1/1999 | Rubin .................................... | 188/379 |
| 5,984,233 | * | 11/1999 | Snyder, Jr. et al. .................. | 244/119 |

\* cited by examiner

*Primary Examiner*—Robert J. Oberleitner
*Assistant Examiner*—Bradley King
(74) *Attorney, Agent, or Firm*—Howard Kaiser

(57) ABSTRACT

The inventive passive damping system features the unique harmonization of: (i) a constrained-layer damping subsystem (wherein an elastomer serves as constrained damping material); (ii) an entrained damping subsystem (wherein a particulate serves as entrained damping material); and, (iii) a tuned damping subsystem (wherein modal properties of certain inventive components have been selectively varied in accordance with anticipated resonance frequencies). The invention's effectiveness is aggregative; the total loss factor for the inventive damping system equals the sum of the individual loss factors for the damping subsystems. Consequently, the invention affords a high loss factor in a broad frequency range. Especially in applications involving control of extremely high vibrations, the inventive damping methodology is more efficient and economical than are common damping methodologies.

25 Claims, 3 Drawing Sheets

TUNED BROADBAND VIBRATIONAL DISSIPATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to damping, more particularly to methods, apparatuses and systems for passively effectuating damping for controlling vibrations.

Vibrations are often unwanted because they can cause structural weakening, metal fatigue, bothersome noise, etc. Particularly undesirable are many situations wherein a power-driven source (e.g., a motor) produces a frequency at which an attached structure naturally vibrates, an occurrence known as "resonance."

Various types of passive damping treatments have been known to be effective in reducing the amplitude of vibrations at resonant frequencies. The known effective passive damping methodologies include "conventional" damping, "entrained" damping and "tuned" damping.

Two known kinds of conventional damping treatment are unconstrained (unconstrained-layer) damping treatment and constrained-layer damping treatment. All of these known passive damping mechanisms, though often highly (or at least moderately) effective for particular applications, nonetheless have limited capabilities in terms of damping performance.

Tuned damping, for example, produces a relatively large loss factor in a narrow frequency band. Therefore, tuned damping is generally applied to reduce single mode vibration. In contrast, constrained-layer damping is effective in a broad frequency, but its loss factor is relatively small. Because of this, constrained-layer damping treatment is relatively effective for controlling the vibrations in higher frequencies, but is less effective in lower frequencies.

A greater amount of damping loss factor has been known to be achieved by applying an increased number of similar passive damping treatments on the structure; however, this sort of "pluralizing" approach to individual units yields a diminishing return in damping effectiveness as the amount of damping treatment (i.e., the number of units) increases.

Active (as distinguished from passive) vibration control methodologies have also been known to effectively reduce vibrations. However, due to limitations regarding processor speed and actuator power delivery, active vibration control has proven rather impractical in high frequency and multimode vibration control. Moreover, the costs associated with installation and maintenance of active vibration control systems, vis-a-vis' passive vibration control systems, are comparatively high.

Generally speaking, depending upon the application, a damping treatment is considered to be effective if the vibrational reduction caused by the damping treatment in turn results in a decrease in at least one of the following: sound radiation; structural stresses attendant fatigue problems in structural members; and, structural-borne wave propagations (i.e., the transmission of vibrational energy along the structure).

SUMMARY OF THE INVENTION

In view of the foregoing, it is a principal object of the present invention to provide a passive vibration damping methodology which is effective over a broad range of frequencies.

It is a further object of the present invention to provide such a methodology which is economical.

The passive vibration damping device according to this invention is conveniently identified herein by the acronym "TBVD" for "Tuned Broadband Vibrational Dissipator." The inventive TBVD provides large loss factors in a broad frequency band. In typical inventive practice, the inventive TBVD is implemented as an add-on damping device.

In accordance with many embodiments of the present invention, the inventive TBVD is a device for effectuating passive vibration damping of a structure which is subject to excitation by a source. The inventive device comprises a viscoelastic layer, a hollow member and granular material. The viscoelastic layer adjoins the hollow member. The granular material at least partially fills the hollow member.

According to many inventive embodiments, the present invention provides a method for effectuating passive vibration damping of a structure which is subject to excitation by a source. The inventive method comprises: providing a hollow member; at least partially filling the hollow member with granular material; and, affixing a viscoelastic layer to the hollow member.

The present invention features a structural integration which affords multi-damping simultaneity. Inventively integrated are various structural components which, customarily, are separately utilized in furtherance of individually corresponding passive damping mechanisms. This inventive structural integration effectuates the synchronization of three passive damping mechanisms—viz., constrained-layer damping, entrained damping and tuned damping. The present invention thereby propitiously affords a cumulative damping effect which is the aggregation of the individual damping effects corresponding to the respective damping mechanisms.

Thus the present invention, unlike previous damping treatments, is designed to simultaneously operate a diverse plurality of damping mechanisms so as to produce a large loss factor in a broad frequency band. Moreover, the present invention provides multiple tuning capability which can be tailored to suppress multiple resonant modes of the structure. Hence, the inventive damping treatment provides a cost-effective way of controlling critical vibrations.

The present invention is especially advantageous insofar as controlling extremely large vibrations. The customary approach to control of very great vibrations involves application of a large amount of conventional damping treatment (which implements elastomeric material)—an approach necessitated by the relatively small loss factor associated with conventional damping treatment. In particular, this invention cost-effectively reduces excesively large flexural vibrations in beam-like, plate-like and cylindrical structures subjected to various loading conditions in a broad frequency range.

Depending on the application, inventive practice can succeed in any or all of the following: (i) reducing the radiated acoustic noise from one or more structures; (ii) reducing the structural-borne transmission path or paths; (iii) providing a comfortable and quiet environment for a ship or a building; (iv) reducing the requirements for vibration-sensitive equipment.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described by way of example, with reference to the accompanying drawings, wherein like numbers indicate the same or similar components, and wherein.

DETAILED DESCRIPTION OF THE INVENTION

According to conventional passive damping treatment, energy is dissipated in a layer of viscoelastic damping material which is attached to the structure. When the structure deforms, strains develop in the viscoelastic damping material, irreversible relaxation occurs, and strain energy is converted to heat. The key to effective conventional damping treatment, therefore, is to maximize the strain energy in the viscoelastic layer. Conventional damping treatment is commonly applied in either of two ways, viz., unconstrained (unconstrained-layer) damping treatment and constrained-layer damping treatment.

According to conventional unconstrained damping treatment, the viscoelastic material is attached to the structure. Energy dissipation is caused by the extensional strains in the viscoelastic layer.

Figure 1A:
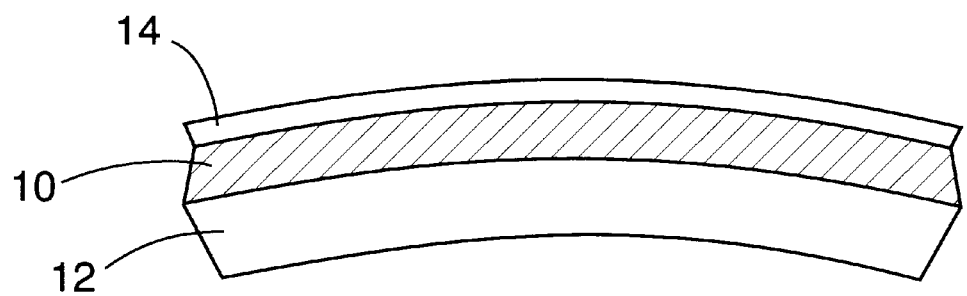
FIG. 1(a) is a diagrammatic cross-sectional representation of constrained-layer damping treatment, illustrating the deformed structural response of this damping mechanism.

Reference is now made to FIG. 1(a), wherein is shown the deformed structural response of conventional constrained-layer damping treatment. According to constrained-layer damping treatment, a viscoelastic layer 10 is sandwiched between a base layer structure 12 and a relatively stiff constraining layer 14. Constraining layer 14 causes shear strains to develop in viscoelastic layer 10 when base layer structure 12 bends, because constraining layer 14 is less extensive than base layer structure 12. Viscoelastic layer 10, intermediate base layer structure 12 and constraining layer 14, thus acts as the constrained layer of the constrained-layer damping system.

Figure 2:
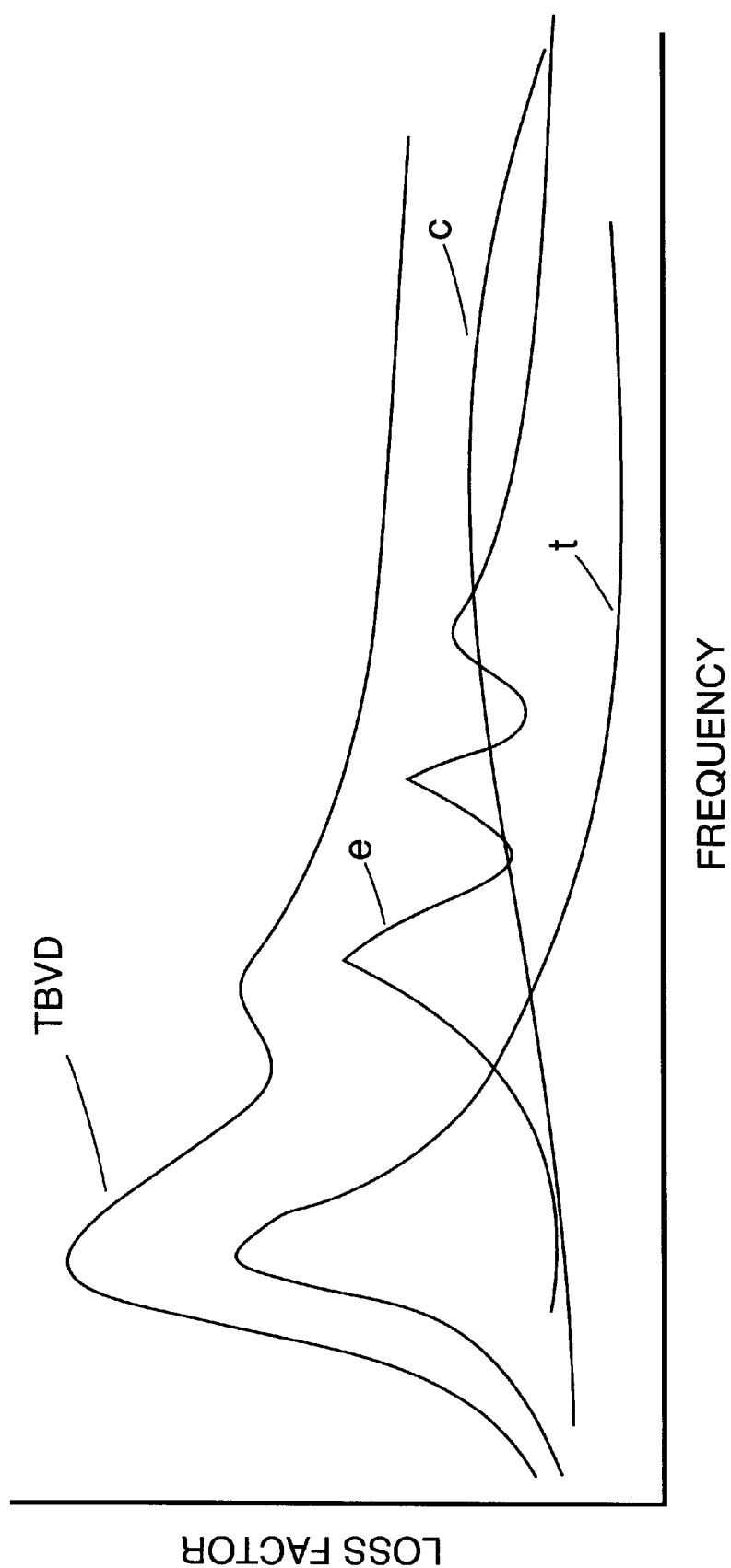
FIG. 2 is a graphical representation which typifies loss factor as a function of frequency for each of the various damping treatments shown in FIG. 1(a), FIG. 1(b), FIG. 1(c) and FIG. 3.

With reference to FIG. 2, the loss factor achievable by constrained-layer damping, described by curve c, exhibits mild frequency dependence and generally is larger than that obtained by unconstrained-layer treatments. As shown in FIG. 2, the loss factor for the constrained-layer damping is rather broad in effect.

The effectiveness of the constrained-layer damping treatment depends on a number of variables. The important properties of the constraining layer include its thickness, its modulus of elasticity, and its density. The important properties of the viscoelastic material used in the constrained-layer damping treatment include its thickness, its density, its modulus of elasticity, and its damping loss factor. The latter two properties (modulus of elasticity; damping loss factor) of the viscoelastic material are functions of both temperature and frequency.

Figure 1B:
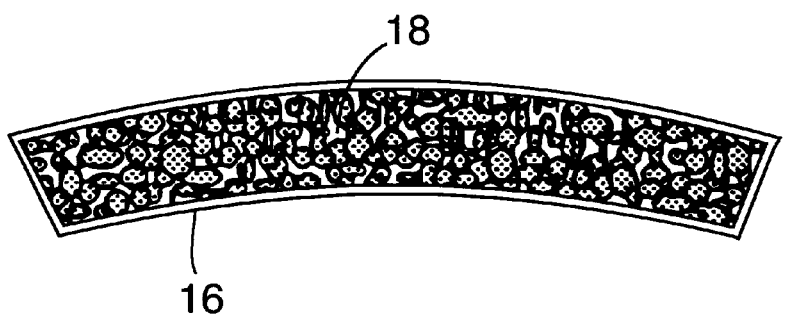
FIG. 1(b) is a diagrammatic cross-sectional representation of entrained damping treatment, illustrating the deformed structural response of this damping mechanism.

Referring to FIG. 1(b), according to entrained damping treatment, a hollow structure 16 (e.g., a tube, tubular beam or other hollow structural object) is filled with granular material 18 such as sand or beads. Like conventional damping treatment, the key to entrained damping treatment performance is to deliver strain energy to the damping material, where it can be dissipated by relaxation mechanisms. Unlike conventional damping treatment, the damping material is granular filler material 18 rather than viscoelastic layer 10. Inter-particle friction of granular material 18 may also dissipate energy, but its importance has not been quantified.

The lowest frequency where entrained damping performance is high is the so-called "cut-on" frequency. The cut-on frequency is the fundamental cross-sectional resonance frequency of granular filler material 18 and also is the lowest frequency at which waves can propagate in granular filler material 18. At and above cut-on, a structure transmits energy into the granular filler material 18 in the form of waves. Below cut-on, granular filler material 18 essentially moves with the structure as a rigid body, adding mass to the structure.

Still referring to FIG. 1(1b) and FIG. 2, energy dissipation is large at the cross-sectional resonance of granular filler material 18, due to vigorous filler motion. Loss factor peaks for entrained damping occur as described by curve e in FIG. 2. The largest peak loss factor occurs at the lowest cross-sectional resonance frequency of granular filler material 18. The cross-sectional resonance frequencies depend on the wave speed of granular filler material 18 and the size of the cross-section. This property gives an opportunity to tune (or design) the entrained damping mechanisms.

Figure 1C:
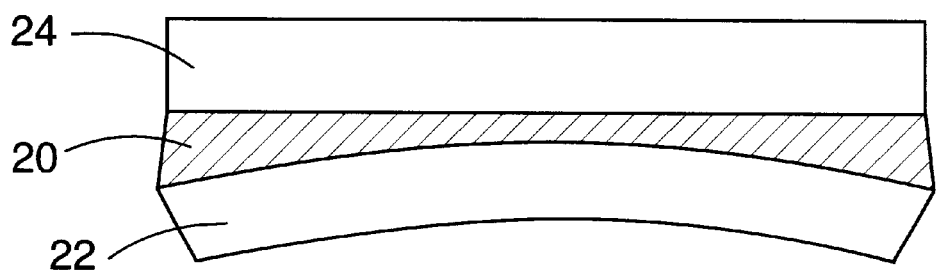
FIG. 1(c) is a diagrammatic cross-sectional representation of tuned damping treatment, illustrating the deformed structural response of this damping mechanism.

Reference now being made to FIG. 1(c), a viscoelastic compliance layer 20 is sandwiched between a base layer structure 22 and a relatively thick elastic constraining layer 24. The tuned damper utilizes a viscoelastic compliance layer 20 and an elastic constraining layer 24 which are each sized to concentrate both reactive and dissipative vibration control mechanisms over a preselected frequency band.

There are two methods of "tuning" the damper (thereby selectively damping the vibrations of the structure) in accordance with tuned damping treatment. According to the first method, elastic constraining layer 24 can act as a lumped tuning mass; tuning is achieved by compressing viscoelastic compliance layer 20. According to the second method, the combination of elastic constraining layer 24 and viscoelastic compliance layer 20 is designed to have one of its eigen frequencies coincide with the frequency of interest; tuning is achieved by adjusting this frequency.

At the design frequency, the tuned damper can be constructed to act as a concerted group of transverse-compressional damping mechanisms which take advantage of the out-of-phase motion between viscoelastic compliance layer 20 and elastic constraining layer 24, thereby producing relatively high composite loss factors in a relatively narrow spectral band, as described by curve t in FIG. 2.

Generally, the response of a structure will differ at each of its different "natural frequencies." The structure will exhibit a different deformation pattern ("mode shape"), depending on which resonant (natural) frequency the excitation is coincident with. People who are skilled in the art of "modal analysis" evaluate the natural characteristics of structures in terms of their natural frequencies and mode shapes. The natural frequency (natural frequencies) of a structure is (are) determined by the mass distribution and the stiffness distribution in the structure.

Below and above the design frequency, the tuned damper (such as shown in FIG. 1(c)) can control radiation from a structure (such as base layer structure 22) by altering the structure's modal character (e.g., by increasing mass per unit area and modal stiffness). In other words, the modal character of the structure can be altered so as to subdue a vibrational mode which is significantly resonant due to excitation of the structure by an excitation source. The structure's modal character can be adjusted by increasing (or decreasing) its mass per unit area and/or its modal stiffness.

Figure 3:
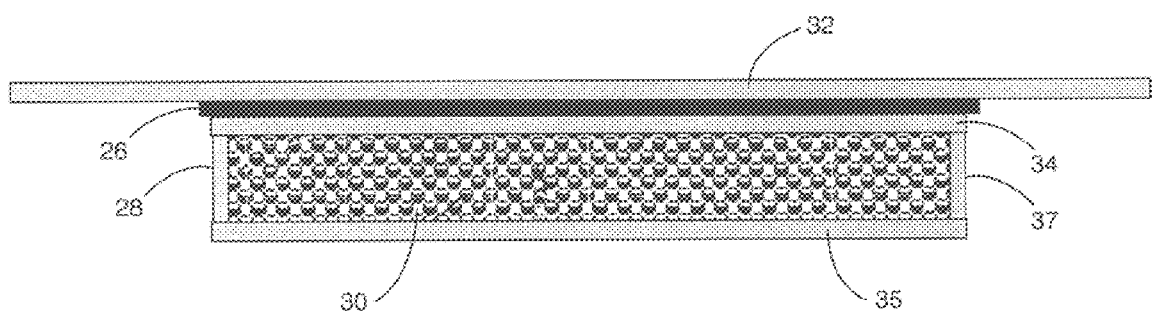
FIG. 3 is a diagrammatic cross-sectional representation of a preferred embodiment of an inventive TBVD.

Reference now being made to FIG. 3, the inventive TBVD is an adjunct (accessory) passive damping treatment device which is designed to concurrently operate the three potentially highly effective damping mechanisms shown in FIG. 1(a), FIG. 1(b) and FIG. 1(c)—viz., constrained-layer damping, entrained damping and tuned damping, respectively.

The inventive TBVD comprises viscoelastic layer 26, hollow member 28 and granular filler material 30 (e.g., beads or sand or other particulate). According to this invention, hollow member 28 is a hollow structural body, such as a hollow rectangular metal (e.g., steel) box, which typically has a surface congruous with a surface of the subject structure (such as base plate 32 shown in FIG. 3). Granular filler material 30 (beads are shown in FIG. 3) at least partially fills hollow member 28. For many inventive embodiments, it is preferable that granular filler material 30 completely fills or substantially fills hollow member 28.

Granular filler material 30 can comprise any aggregation of discrete bodies which lends itself to being selectively changed with respect to its overall mass stiffness and loss factor. In the light of this disclosure, it is apparent to the ordinarily skilled artisan that granular filler material 30 can be designed in a variety of ways in furtherance of optimizing the tuning frequency and increasing the loss factor. Accordingly, granular filler material 30 can be, depending upon the inventive embodiment, either homogeneous or heterogeneous in size, shape and/or material composition.

For instance, some inventive embodiments can effectively implement composite bead-like granular filler material, wherein each composite sphere comprises a metal (e.g., steel) core and a high loss viscoelastic material covering. For typical such inventive embodiments, the loss factor of the viscoelastic covering is in the range between about 0.1 and about 0.5. Such material combination of each discrete spherical body would beneficially afford high mass as well as high loss factor. These composite balls comprising viscoelastic-coated metal (e.g., steel) can constitute all of granular filler material 30, or can be combined with one or more other kinds of granular filler material 30. In fact, depending upon the inventive embodiment, the composite balls themselves can be either homogeneous or heterogeneous in size, shape and/or material composition.

The inventive TBVD is attached onto a structural foundation (for example, a base layer structure such as base plate 32) by means of a self-adhesive viscoelastic layer 26. Viscoelastic layer 26 is sandwiched between base plate 32 and hollow member 28. More specifically, viscoelastic layer 26 is sandwiched between base plate 32 and member face 34.

In the light of this disclosure, it is understood by the ordinarily skilled artisan that inventive practice can render attachment of the inventive TBVD (e.g., via self-adhesive viscoelastic layer 26) to any structural foundation, assuming the suitability of such attachment for furthering inventive purposes. The structural foundation itself is typically the entity for which effectuation of inventive damping is exclusively or principally intended. Generally, the inventive TBVD is directly attached to the structural foundation—that is, the subject structure itself to which inventive damping is being applied.

The subject structure can be a stand-alone body or can be an interposed body between another structural entity and the inventive TBVD. Whether the subject structure is disconnected or connected to another structural entity, the inventive TBVD essentially effects inventive damping of the subject structure.

For many inventive applications, the subject structure is approximately shaped like a plate (as shown in FIG. 3), a beam or a cylinder. It is readily apparent to the ordinarily skilled artisan who reads this disclosure that the inventive principles illustrated in FIG. 3 are readily applicable to subject structures having a variety of shapes. Typically, the inventive apparatus engages a substantially smooth surface, either flat or curved, of the subject structure.

It is readily envisioned, for instance, that base plate 32 is, instead, a base beam 32, so that hollow member 28 would similarly have a flat member side 34 in conformity with the flatness of base beam 32. As another example, it is readily envisioned that base plate 32 is, instead, a base cylinder 32, so that hollow member 28 would have a curved member side 34 (eg., slightly curved) in conformity with the curvature of base cylinder 32.

Member face 34 is a solid, planar, containment layer (the upper horizontal layer, as shown in FIG. 3) which forms a part of hollow member 28 (which contains granular filler material 30). Member face 34 represents a geometric side of the geometric shape of hollow member 28.

Many inventive embodiments provide two opposite member faces as part of hollow member 28. As shown in FIG. 3, member face 35 is opposite member face 34. Member face 35 similarly is a solid, planar, containment layer (the lower horizontal layer, as shown in FIG. 3) which forms a part of hollow member 28. Member face 34 similarly represents a geometric side of the geometric shape of hollow member 28.

For many inventive embodiments, hollow member 28 is trapezoidal in cross-section; that is, the two opposite member faces 34 and 35 are approximately planar and approximately parallel. For instance, such a hollow member 28 can be rectangular in cross-section (eg., box-shaped or disk-shaped), such as shown in FIG. 3. Thus, one may consider hollow member 28 shown in FIG. 3 to be a hollow rectangular metal (e.g., steel) box, wherein member faces 34 and 35 are approximately equivalent, each being a flat, rectangular, plate-like, steel section of hollow member 28.

It is readily envisioned, for instance, that base plate 32 is, instead, a base beam 32, so that hollow member 28 would similarly have an approximately rectangular cross-section wherein approximately parallel, opposite member sides 34 and 35 are each flat in conformity with the flatness of base beam 32. As another example, it is readily envisioned that base plate 32 is, instead, a cylinder 32, so that hollow member 28 would have an approximately rectangular cross-section wherein approximately parallel, opposite member sides 34 and 35 equivalently are curved (e.g., slightly curved) in conformity with the curvature of base cylinder 32.

Viscoelastic layer 26 and member face 34 act, together with a foundational constraint upon the opposite side of viscoelastic layer 26, toward achieving the constrained-layer damping aspect of the inventive TBVD. As shown in FIG. 3, base plate 32 serves as the foundational constraint. Viscoelastic layer 26 is sandwiched, and thereby constrainable, between structural face 34 and base plate 32.

Member face 34 thus functions as the inventive TBVD's constraining layer for viscoelastic layer 26, wherein viscoelastic layer 26 is being oppositely constrained by base plate 32. Viscoelastic layer 26 is situated intermediate base layer 32 and member face 34, each of which exerts a constraining influence of viscoelastic layer 26. Viscoelastic layer 26 operates as the constrained layer within the invention's constrained-layer damping subsystem.

Granular filler material 30 (e.g., beads, as shown in FIG. 3), which completely or partially fills hollow member 28, represents the entrained damping aspect of the inventive TBVD. According to the invention's entrained damping subsystem, granular filler material 30 behaves as the particulate damping material which is entrained within hollow member 28.

The combination of viscoelastic layer 26, hollow member 28 and granular filler material 30 performs the inventive tuned damping. Each of these constituents of the invention's tuned damping subsystem is alterable in furtherance of attaining a desired modal character of the inventive TBVD, and hence a desired modal character of the structure which the inventive TBVD engages.

According to the tuned damping aspect of the present invention, any one, any two or all three of the following parameters—(i) the stiffness of viscoelastic layer 26, (ii) the mass of hollow member 28, and/or (iii) the mass of granular filler material 30—can be "tuned" (i.e., selectively changed) in order to suppress a dominant resonant mode of base plate 32. Generally in inventive practice, the inventive "tuning" objective remains to adjust the modal character of the inventive TBVD (and hence, of the structure) in accordance with the driving frequency or frequencies of the excitation source.

In typical inventive practice, the stiffness of viscoelastic layer 26 can be varied by varying viscoelastic layer 26, and/or by varying the degree to which viscoelastic layer 26 is compressed between structural face 34 and base plate 32. The mass of hollow member 28 can be varied by varying hollow member 28, and/or by adding structural mass thereto or subtracting structural mass therefrom. Similarly, the mass of granular filler material 30 can be varied by varying granular filler material 30, and/or by adding granular filler material 30 to, or subtracting granular filler material 30 from, the space within hollow member 28.

It is understood by the ordinarily skilled artisan who reads this disclosure that viscoelastic layer 26 is inventively tailored to suit a particular embodiment or application, and thus can be characterized by any degree of stiffness or by any loss factor, depending on such embodiment or application.

Variation of mass of hollow member 28 can be inventively achieved, for instance, by providing one or more removably attachable weighted objects which to some extent or in some respect conform with the shape of hollow member 28. For example, supplemental metal plate(s) can be attached to or detached from member face 34 or member face 35. Alternatively, supplemental metal rectangles or rings can be attached to or detached from lateral member periphery 37.

In the light of this disclosure, various techniques for adjusting or altering physical or material characteristics of the inventive TBVD in furtherance of inventive modal tuning will be apparent to the ordinarily skilled artisan. For instance, accessibility to/from the interior cavity of hollow member 28 can be provided by an inlet/outlet valve or a door. Main components of the inventive TBVD can be modularized. Hollow member 28 can be so constructed as to permit ease of assembly and disassembly, and/or ease of annexation and removal of supplemental parts. Viscoelastic layers 26 having appropriate dimension and varying properties can be made available and used interchangeably.

The effective loss factor of the TBVD, $\eta_{TBVD}$ is the sum of all the loss factors produced by individual damping mechanisms acting on the system. That is, $$\eta_{TBVD} = \eta_t + \eta_e + \eta_c,$$

where $\eta_t$, $\eta_e$ and $\eta_c$ are the loss factors for tuned damping, entrained damping and constrained-layer damping, respectively.

The expected loss factor for the inventive TBVD is described by curve TBVD in FIG. 2. Due to the multi-damping mechanisms acting simultaneously on base plate 32, the inventive damping treatment produces an unusually large loss factor in a broad frequency band. This inventive benefit is particularly attractive in controlling excessively large vibrations. Normally, extremely great vibrations require a large amount of conventional damping treatment, since the damping loss factor associated with conventional damping treatment is relatively small.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A device for effectuating passive vibration damping of a structure which is subject to excitation by a source, said structure having a structure surface, said device comprising a viscoelastic layer and a nonviscoelastic hollow member and granular material, said hollow member having a hollow and an inside member surface and an outside member surface, said inside member surface facing generally inwardly and said outside member surface facing generally outwardly, said inside member surface inwardly demarcating said hollow member and outwardly demarcating said hollow, said outside member surface outwardly demarcating said hollow member, said hollow member including an at least substantially metallic member portion having on approximately opposite sides an inside portion surface and an outside portion surface, said outside member surface including said outside portion surface, said inside member surface including said inside portion surface, said viscoelastic layer having on approximately opposite sides a first viscoelastic surface and a second viscoelastic surface, said granular material comprising plural granules, said viscoelastic layer adjoining said hollow member whereby said outside portion surface is at least substantially adjacent said second viscoelastic surface, said granular material at least substantially filling said hollow, said inside portion surface touching some said granules, said granules being generally contiguous with respect to each other, said device being adaptable to attachment to said structure wherein said viscoelastic layer adjoins said structure whereby said first viscoelastic surface is at least substantially adjacent said structure surface, said viscoelastic layer thereby being situated between said structure and said hollow member.

2. A device as in claim 1, wherein when said device is attached to said structure the combination of said structure, said viscoelastic layer and said member portion is capable of effectuating constrained-layer damping of said structure whereby said viscoelastic layer is constrained between said member portion and said structure.

3. A device as in claim 1, wherein at least some said granules are composite balls, each said composite ball comprising a metal core and a high loss viscoelastic layer.

4. A device as in claim 1, wherein when said device is attached to said structure the combination of said hollow member and said granular material is capable of effectuating entrained damping of said structure whereby said granular material is entrained within said hollow member.

5. A device as in claim 1, wherein said structure has an approximate shape selected from the group consisting of plate, beam and cylinder, wherein said structure surface defines a geometry selected from the group consisting of at least substantially flat and at least substantially curved, wherein said first viscoelastic surface defines a geometry selected from the group consisting of at least substantially flat and at least substantially curved, and wherein said first viscoelastic surface and said structure surface at least substantially comport with each other.

6. A device as in claim 1, wherein when said device is attached to said structure the combination of said viscoelastic layer, said hollow member and said granular filler material is capable of effectuating tuned damping so as to subdue a resonant mode of said structure.

7. A device as in claim 6, wherein said tuned damping is characterized by adjustability in accordance with said structure, and wherein said adjustability includes changing at least one parameter selected from the group consisting of the modal stiffness of said viscoelastic layer, the mass of said hollow member, and the mass of said granular material.

8. A device as in claim 6, wherein the combination of said structure, said viscoelastic layer and said member portion is capable of effectuating constrained-layer damping of said structure whereby said viscoelastic layer is constrained between said member portion and said structure.

9. A device as in claim 6, wherein when said device is attached to said structure said granular material is capable of effectuating entrained damping of said structure whereby said granular material is entrained within said hollow member.

10. A device as in claim 9, wherein the combination of said structure, said viscoelastic layer and said member portion is capable of effectuating constrained-layer damping of said structure whereby said viscoelastic layer is constrained between said member portion and said structure.

11. A device as in claim 1, wherein said member portion is a first member portion, wherein said hollow member includes an at least substantially metallic second member portion, wherein said outside portion surface is a first outside portion surface, wherein said inside portion surface is a first inside portion surface, wherein said second member portion has a second outside portion surface and a second inside portion surface, wherein said first outside portion surface and said second outside portion surface face approximately away from each other, wherein said first inside member surface and said second inside portion surface face approximately toward each other, wherein said second inside portion surface touches some said granules, wherein said first member portion generally defines a first portion shape selected from the group consisting of flat planar shape and curved planar shape, wherein said second member portion generally defines a second portion shape selected from the group consisting of flat planar shape and curved planar shape, and wherein said first portion shape and said second portion shape are approximately parallel to each other.

12. A device as in claim 11, wherein said hollow member approximately defines a member shape selected from the group consisting of hollow box and hollow disk.

13. A device as in claim 1, wherein:
said member portion is characterized by an at least substantially uniform thickness between said inside portion surface and said outside portion surface;
said viscoelastic layer is characterized by an at least substantially uniform thickness between said first viscoelastic surface and said second viscoelastic surface; and said structure surface, said inside portion surface, said outside portion surface, said first viscoelastic surface and said second viscoelastic surface are each at least substantially continuous.

14. Passive vibration damping apparatus for coupling with a foundation, said foundation having a foundation face, said apparatus comprising tuned damping means, constrained damping means, and entrained damping means, wherein:

said tuned damping means includes a nonelastomeric container, elastomeric material, and particulate material;

said particulate material includes a plurality of particles;

said container has a void and includes six rigid container face sections which together describe an approximate rectangular parallelepiped shape:

each said container face section has, on approximately opposite sides of said container face section, an interior section face and an exterior container face;

said interior container faces together interiorly delimit said container and exteriorly delimit said void;

said exterior container faces together exteriorly delimit said container;

said elastomeric material includes an upper elastomeric face and a lower elastomeric face;

said lower elastomeric face securely abuts a said exterior container face;

said upper elastomeric face is for secure abutment in relation to said foundation face, said elastomeric material thus being interposable between said foundation and a said container face section;

said particulate material is situated within and approximately completely occupies said void, said particles generally being in contact with one another;

during said coupling of said apparatus with said foundation and responsive to a vibrational stimulus, said tuned damping means acts as a concerted group of damping mechanisms characterized by a modal character such that said tuned damping means is suppressive of at least one resonant mode of said foundation;

said constrained damping means includes said elastomeric material and said container face section having said exterior container face which said lower elastomeric face securely abuts;

during said coupling of said apparatus with said foundation and responsive to a vibrational stimulus, said elastomeric material acts as damping material which is constrained between said foundation and said container face section having said exterior container face which said lower elastomeric face securely abuts;

said entrained damping means includes said container and said particulate material; and during said coupling of said apparatus with said foundation and responsive to a vibrational stimulus, said particulate material acts as damping material which is entrained within said container.

15. Passive vibration damping apparatus according to claim 14, wherein at least one said container face section, including said container face section having said exterior container face which said lower elastomeric face securely abuts, is at least substantially composed of metal.

16. Passive vibration damping apparatus according to claim 14, wherein said modal character is selectively modifiable by tuning at least one characteristic of said tuned damping means; and wherein said characteristic is selected from the group of characteristics consisting of the mass of said container, the rigidity of said elastomeric material, and the mass of said particulate material.

17. A method for effectuating passive vibration damping of a structure which is subject to excitation by a source, said structure having a structure periphery, said method comprising:
   providing a vessel which is at least substantially made of a nonviscoelastic material, said vessel having an interior space and a rigid wall which surrounds said interior space, said wall having an outer wall periphery and an inner wall periphery, said outer wall periphery circumscribing said vessel, said inner wall periphery circumscribing said interior space;
   at least substantially filling said interior space with granular material so that the aggregation of said granular material is generally in mutual communication;
   affixing a viscoelastic layer to said vessel, said viscoelastic layer having a vessel-associative side and a structure-associative side approximately opposite said vessel-associative side, said affixing including abuttedly connecting said vessel-associative side and a portion of said outer vessel periphery; and
   affixing said viscoelastic layer to said structure, said affixing including abuttedly connecting said structure-associative side and a portion of said structure periphery.

18. A method as in claim 17, wherein said structure has an approximate shape selected from the group consisting of plate, beam and cylinder, and wherein:
   if said approximate shape is a plate, said structure-associative side and said portion of said structure periphery are each approximately flat;
   if said approximate shape is a beam, said structure-associative side and said portion of said structure periphery are each approximately flat; and
   if said approximate shape is a cylinder, said structure-associative side and said portion of said structure periphery are each approximately curved.

19. A method as in claim 17 further comprising tuning in anticipation of said excitation of said structure by said source, wherein said tuning includes adjusting at least one parameter selected from the group consisting of the modal stiffness of said viscoelastic layer, the mass of said vessel, and the mass of said granular material.

20. A method as in claim 19, wherein said adjusting at least one parameter includes considering at least one resonance frequency of said structure when subjected to excitation by said source.

21. A method as in claim 19, wherein said adjusting at least one parameter includes considering at least one natural frequency of said structure.

22. A method as in claim 21, wherein said adjusting at least one parameter includes considering at least one driving frequency of said source.

23. A system for passively damping a structure, said structure having a structure periphery, said structure periphery including a structure peripheral region, said system comprising:
   a receptacle which is at least substantially made of a rigid nonviscoelastic material, said receptacle encompassing an interior space and being characterized by a receptacle inner periphery and a receptacle outer periphery, said receptacle inner periphery bounding said interior space, said receptacle outer periphery including a receptacle outer peripheral region;
   particulate which at least substantially fills said interior space so that said particulate is generally in mutual contact with each other and so that at least a substantial area of said receptacle inner periphery contacts a portion of said particulate; and
   an at least substantially solid viscoelastic body having two approximately oppositely facing sides, said sides being a receptacle-junctional side and a structure-junctional side, said receptacle-junctional side being suitable for being mated with said receptacle outer peripheral region, said structure-junctional side being suitable for being mated with said structure peripheral region.

24. The system for passively damping according to claim 23 wherein said receptacle is at least substantially made of a metallic material, and wherein upon said receptacle-junctional side being mated with said receptacle outer peripheral region and said structure-junctional side being mated with said structure peripheral region:
   said system is approximately symmetrical with respect to an imaginary axis passing therethrough;
   said receptacle-junctional side, said structure-junctional side, said receptacle outer peripheral region and said structure peripheral region are approximately parallel with respect to each other; and
   said imaginary axis is approximately perpendicular with respect to said receptacle-junctional side, said structure-junctional side, said receptacle outer peripheral region and said structure peripheral region.

25. The system for passively damping according to claim 24, wherein:
   said receptacle-junctional side, said structure-junctional side, said receptacle outer peripheral region and said structure peripheral region are each approximately planar; and
   said receptacle inner periphery and said receptacle outer periphery approximately describe similar shapes selected from the group consisting of rectangular parallelepiped and rectangular disk.

* * * * *